Nov. 8, 1932.  A. C. HARRELL  1,886,398
AUTOMATIC TRAIN PIPE COUPLING
Filed Aug. 13, 1931  2 Sheets-Sheet 1
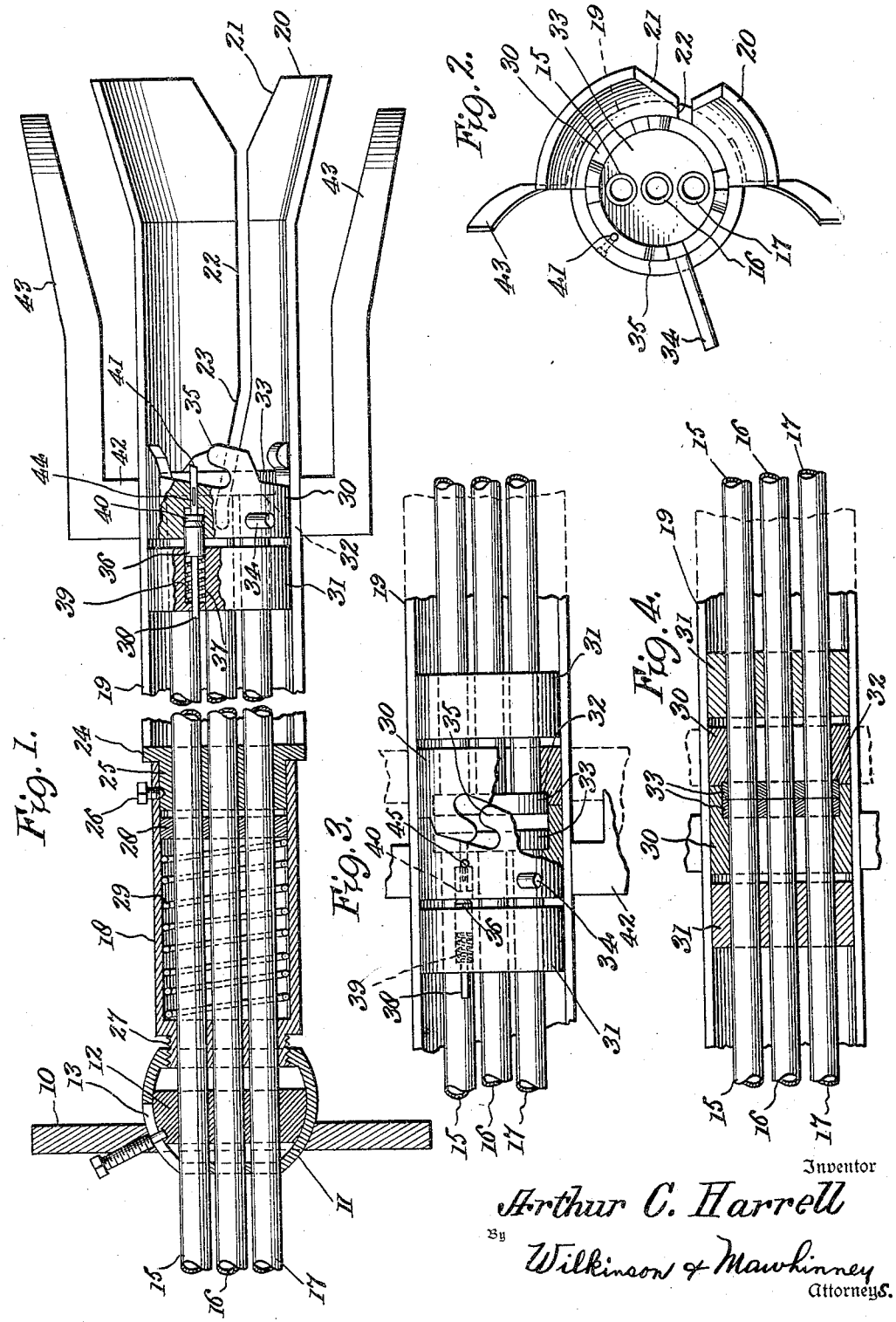
Inventor
Arthur C. Harrell
By Wilkinson & Mawhinney
Attorneys.

Nov. 8, 1932.  A. C. HARRELL  1,886,398
AUTOMATIC TRAIN PIPE COUPLING
Filed Aug. 13, 1931    2 Sheets-Sheet 2
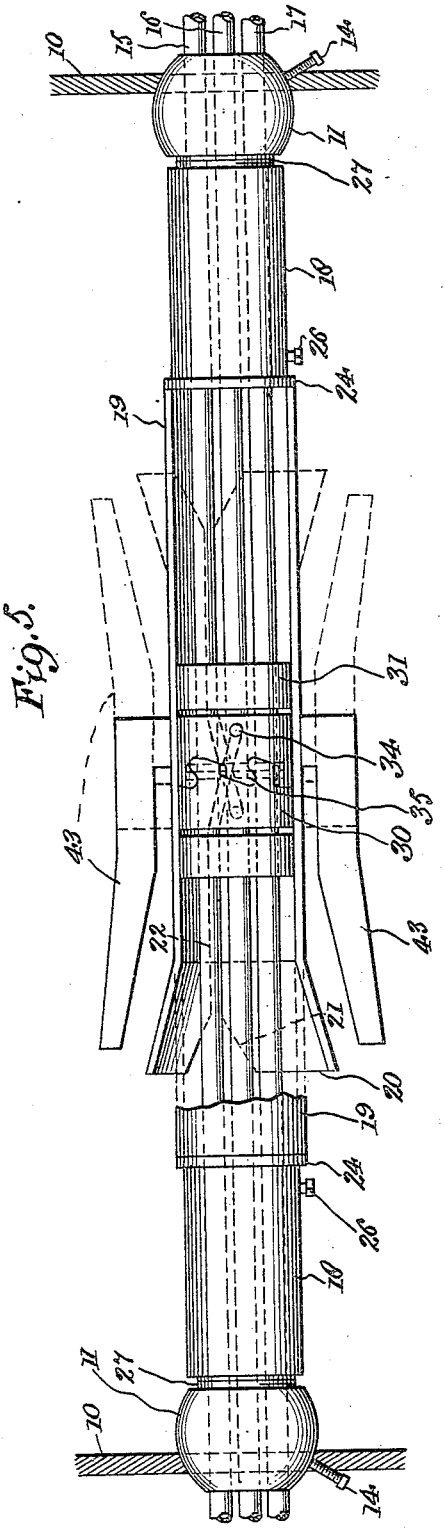
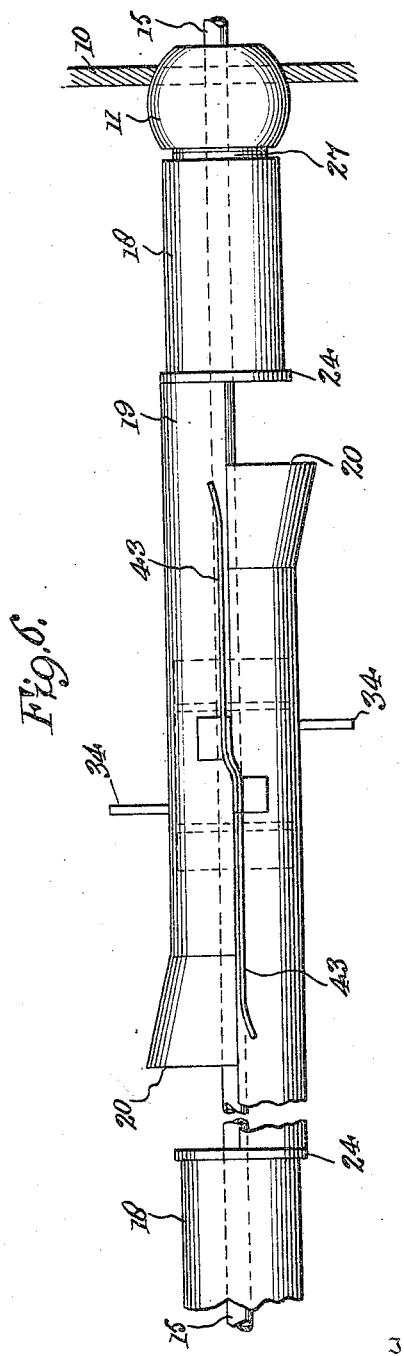
Inventor
Arthur C. Harrell
By Wilkinson & Mawhinney
Attorneys.

Patented Nov. 8, 1932

1,886,398

UNITED STATES PATENT OFFICE

ARTHUR C. HARRELL, OF PENSACOLA, FLORIDA

AUTOMATIC TRAIN PIPE COUPLING

Application filed August 13, 1931. Serial No. 556,883.

The present invention relates to improvements in automatic train pipe couplings, and has for an object to provide certain improvements over my prior Patent No. 1,667,033, granted April 24, 1928.

It is an object of the present invention to provide an automatic train pipe coupling in which provision is made for a fluid tight coupling between one or more train pipes; and in which a secure locking engagement is had at all times during the normal coupling of the cars.

The invention or improvement is also applicable to trucks, electric cars, fire hose, etc.

Another object of the improvement is to provide a better automatic train pipe coupling in which the parts will always be preserved in proper alinement, so that their automatic interfitting and interlocking movement will be facilitated and positively had upon movement of the cars together.

It is a further object of the invention to provide an automatic train pipe coupling so situated and mounted on the cars as to have universal movement for the proper positioning of the parts.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal section taken through an automatic train pipe coupling constructed in accordance with the present invention.

Figure 2 is an end view of the same.

Figure 3 is a fragmentary side view showing the two coupling heads brought together just prior to rotation into interlocking engagement.

Figure 4 is a similar view showing the interlocked engagement of the parts.

Figure 5 is a side elevation, with parts broken away and parts shown in section, of the devices on two cars brought together and in final coupled position, and Figure 6 is a top plan view of Figure 5 with portions broken away.

Referring more particularly to the drawings, the car or a support carried thereby is indicated at 10 and in this support is mounted a universal housing 11 in which is movably mounted a universal ball joint 12. In the housing 11 is a slot 13 through which a set screw 14 extends into the universal ball joint 12.

Three train pipes 15, 16 and 17 are shown as passing slidably through the universal joint 12 and through a cylinder 18 into the sleeve 19 which carries at its outer end the cuff 20. The cuff is provided with a wide or flaring mouth 21 leading to a slot 22 having an inclined or offset portion 23 for a purpose later described.

The sleeve 19 is formed with a shoulder part 24 against which the outer end of the cylinder 18 abuts where it is received over a bearing or guide part 25. A set screw 26 passes through the cylinder 18 and into the bearing part 25 to hold the parts together and against rotation.

At its other end the cylinder 18 is formed with a reduced and exteriorly threaded neck 27 adapted to screw into the adjoining end of the universal housing 11.

The train pipes 15, 16 and 17 slide freely through the bearing 25; but in the cylinder 18 is a traveling piston or plunger 28 affixed to the train pipes so as to move therewith. A coil spring 29 abuts at one end against the plunger 28 and at its other end against the wall of the cylinder 18. In this way the spring 29 tends to urge the train pipes and the coupling head 30 carried thereby outwardly.

A cylindrical guide block or bearing 31 is fixed in the sleeve 19 and is provided with as many openings as there are train pipes; the train pipes slidably fitting therethrough. The ends of the train pipes are secured in the coupling head 30. This coupling head consists of an external rotatable ring 30 hollow within and having a shoulder 32 against which a non-rotatable plate 33 engages. This non-rotatable plate 33 receives therethrough the train pipes 15, 16 and 17, the ends of the pipes being exposed on the outer face of the plate 33.

As shown in Figure 2 the sleeves 19 and cuffs 20 are semi-cylindrical and the rotary ring portions 30 of the coupling heads carry pins 34 projecting out the open sides of the sleeves for entering the mouths 21 and the slots 22 of the opposed cuffs and sleeves, whereby to secure rotation of the coupling head rings 30, which rings carry the hooks 35 for interlocking together in the manner shown in Figures 3, 4 and 5.

Plungers 36 are carried movably in sockets 37 in the guide blocks 31, such plungers having pins 38 thereon projecting through the rear walls of the blocks 31. Coil springs 39 surround the pins 38 and tend to urge the plungers 36 outwardly and into sockets 40 in the coupling rings 30 whereby normally to prevent the casual or accidental rotation of the rings 30, such as might shift the hooks 35 out of a proper alinement.

The rings 30 carry pins 41 axially of the plungers 36 and positioned to engage and strike the plungers 36 for moving the same out of the sockets 40. The outer ends of the pins 41 projects sufficiently far to engage portions of the ring 30 of an opposite coupling head when the two coupling heads are brought together. The pins 41 are limited in their movement by the elongated slots 44 in the same for engaging the inner ends of the set screws 45 carried by the rings 30. When the coupling heads approach the position shown in Figure 3 the length of the pins 41 is such that division line between the pins 41 and plungers 36 will coincide with the inner face of the ring 30, so that the ring 30 may be rotated without interference from the locking plungers 36 whereby to inter-engage the hooks 35 and cause an interlocking of the couplings, as shown in Figures 4 and 5.

On the sleeves 19 are guide wings consisting of short connecting parts 42 extending at substantially right angles away from the outer portions of the sleeves 19 at diametrically opposite points. Extending forward from these pieces 42 are the arms 43 which arms have forward outwardly flaring or inclined portions which are curved or sloped also in a lateral direction, as indicated in Figure 2. When the two couplings of opposite cars come together these arms or horns 43 which slope in opposite directions come together and guide the parts together. They moreover prevent the sleeves and cuffs from spreading as otherwise could be the case particularly on a sharp curve.

In the use of the device, the improved train pipe coupling will preferably be placed in the longitudinal center of the car and just under the present draw head and draw bar to which it may be fastened. The coil springs 29 will urge the train pipes outwardly but provide a yieldable backing for the same when the two heads of adjoining cars abut together, as indicated in Figures 3 and 4.

The springs 29 will be placed under tension preferably in the interlocked position of the coupling heads, as indicated in Figures 4 and 5, so that a tight joint will always be made between the two abutting face plates 33, which face plates are preferably provided with gaskets which are compressed by the locking device. When the heads approach one another, as indicated in Figure 3, the pins 41 are engaged and the locking plungers 36 moved out of the sockets 40, so that upon further movement together the coupling heads may be rotated by the engagement of the pins 34 in the inclined portions 23 of the slots, whereby the hooks 35 are moved into final interlocking engagement that compress the gaskets.

Preferably the center pipe 16 will be used to carry steam, thereby heating the train pipes 15 and 17 and preventing the coupling head from freezing.

In accordance with the invention it is no longer required to provide individual couplings for each hose requirement, but a single coupling may receive any number of train pipes. In the case of freight cars, the pathways of pipes not required can be left open and no train pipe inserted. The set screws 26 will prevent the turning of the device and the throwing of the train pipes out of line.

In order to maintain the cylinder 18 in position and permit the necessary movement in the required direction the universal joint is employed. The set screw 14 will prevent the rotation of the universal or ball joint about its own axis as such movement would tend to bring the train pipes out of line in the coupling heads.

It will be noted that the knuckles or hooks 35 are cut out directly from the revolving part of the coupling head. While four such knuckles are shown in the drawings formed on the outer edge of the coupling head 30 any number may be cut to register with those cut in the complemental coupling head. The guide wings or arms 43 will insure correct alinement of the cuffs and sleeves. These locks or arms 43 will pull both sleeves and their assemblies tightly together, will prevent the sleeves from turning or twisting and insure the bringing of the sleeves and cuffs into alinement.

The parts 25 and 27 constitute stationary guides for the train pipes to slide in. The block guide 31 may be movable or immovable, but preferably the train pipes are screwed or otherwise secured therein, and such device moves along the semi-cylindrical sleeve 19 with the train pipes and with the coupling head.

The gaskets which are not shown in the drawings will be placed on the outer ends of the train pipes so that the gaskets will be held from being lost by grooving the face plates.

It is obvious that various changes and modifications may be made in the details of construction and design of the above specifically described embodiment of this invention without departing from the spirit thereof, such changes and modifications being restricted only by the scope of the following claims.

What is claimed is:

1. In an automatic train pipe coupling, a plurality of train pipes, a nonrotatable plate on the outer ends of the train pipes, a rotatable coupling head internally shouldered to receive the plate and permit the former to rotate about the latter, a fixed guide ring for holding the train pipes in alinement, means for locking the coupling head to the guide ring in normal uncoupled position, a plurality of hooks formed on the outer edge of the coupling head, movable therewith to contact with the corresponding hooks on the adjacent coupling head and allow the hooks to engage the locking means to release the coupling head, and means for rotating the coupling head whereby the forward movement of the same permits the non-rotatable plate and train pipes to contact and slide with the corresponding parts on the adjacent member to provide a tight connection between the train pipes.

2. In an automatic train pipe coupling, a train pipe, a non-rotatable plate on the outer end of the train pipe, an interlocking coupling head rotatable about the plate, a fixed guide ring for supporting the train pipe, means for locking the coupling head to the guide ring with the parts in normal uncoupled position, a plurality of hooks carried by the coupling head and when brought into alinement with the corresponding hooks on an adjacent coupling head unlock the coupling head from the guide ring, a slotted sleeve and cuff carried by the car, means provided with the coupling head for engaging the slotted sleeve to rotate the coupling head whereby the hooks are interlocked and the coupling head forced forward to permit the plate and train pipe to contact directly and move with the corresponding parts on the adjacent car, and curved guide wings carried by the sleeves for engaging one another when the cars are moved together whereby to prevent spreading of the sleeves.

ARTHUR C. HARRELL.